United States Patent
Anderson

[15] 3,660,846
[45] May 2, 1972

[54] AUTOMATIC COLLISION WARNING SYSTEM

[72] Inventor: Lawrence F. Anderson, 818 North Delaware Ave., #402, San Mateo, Calif. 94401

[22] Filed: Oct. 23, 1969

[21] Appl. No.: 868,806

[52] U.S. Cl..................................343/7 ED, 343/112 CA
[51] Int. Cl............................................G01s 9/02
[58] Field of Search..........................343/7 ED, 7.3, 112 CA

[56] References Cited

UNITED STATES PATENTS

| | | | |
|---|---|---|---|
| 3,271,764 | 9/1966 | Atlas et al. | 343/7.3 X |
| 3,420,572 | 1/1969 | Bisland | 343/7 ED X |
| 3,474,444 | 10/1969 | Okamoto | 343/7 ED |
| 3,324,467 | 6/1967 | Crow et al. | 343/7.3 |

*Primary Examiner*—Malcolm F. Hubler
*Attorney*—Gregg & Hendricson

[57] ABSTRACT

A simplified collision warning system particularly applicable for ships and automatically producing an alarm signal upon the persistence of an object within a predeterminable range. The video output of conventional radar is employed with a variable range gate and counter to actuate an alarm when a target return signal remains within a set gate range for a preset number of radar sweeps.

6 Claims, 2 Drawing Figures

AUTOMATIC COLLISION WARNING SYSTEM

BACKGROUND OF INVENTION

There have been developed a wide variety of collision warning systems and these normally incorporate means for deriving the range, bearing and course of objects detected and oftentimes refer these to the course and speed of the vehicle carrying the system. Many systems of this general nature have been developed for use with aircraft, missiles and the like, and it is conventional for these systems to incorporate substantial complexity. It is in fact necessary for many applications of this type of system to provide a large amount of information in order to accurately apprise an operator of the true danger of collision for substantially instantaneous decisions concerning change of course, for example. Some of these systems are in fact designed for the interception of missiles and consequently must be extremely accurate and all-encompassing insofar as information provided.

The status of the art in this general field is generally of a highly complex nature and, as noted above, many applications require this complexity for the necessary output. There are, however, other applications of collision warning systems in which the complexity of known systems is so great as to generally preclude the utilization thereof. While it is common to consider the problems of aircraft collision, it is yet a fact that ship collision is probably equally likely and, at least oftentimes more serious insofar as the total loss of property and life is concerned. With regard to ship collision warning systems it is realized that various such systems have been developed and yet do not appear to be in general use. Also these systems only provide a warning upon the ship carrying the equipment so that an approaching ship, for example, may receive no collision warning. At least most commercial as well as pleasure vessels operate without any type of collision warning system, not only because of the initial cost of installation but furthermore because of the cost and continuous necessity of maintaining such gear in fully operating condition.

It is thus believed to be clear that many applications of collision warning systems do not require the sophistication nor complication of the majority of systems that have been devised for this purpose. There is, however, quite commonly employed upon ships some type of radar equipment. The refinement and simplification of this type of equipment has extended the utilization thereof to many, if not most, classes of vessels. It is true that with a conventional radar system aboard a vessel it is possible for a ship's officer to determine the approach of another vessel or object so as to ascertain the likelihood or danger of collision. Unfortunately in general practice it is often the case that radarscopes are either set to the wrong range, improperly interpreted or even ignored. Radar equipment requires human interpretation and such is subject to mistake as well as failure to exercise.

The present invention provides a positive alarm signal from conventional radar video signals. Although in most simple form the present invention may produce an alarm signal when no collision is in fact imminent, the invention reverses the situation from that described above so that human interpretation or determination must be made after automatic collision warning. Thus there is provided herein a positive safety factor with a minimum of complexity of equipment and circuits.

SUMMARY OF INVENTION

There is provided by this invention a positive acting alarm that may be either audio or visual or both, but which automatically operates upon the positive identification of an object within a predetermined range of a vessel. This positive identification is herein provided by the inclusion of counting means operated by radar video signals and adjusted or adjustable to actuate or energize the system only following a predetermined number of object detections. The invention furthermore provides for controllable or adjustable establishment of the range within which the invention is operable. This is accomplished herein by the provision of a variable range gate circuit operating upon the video output of a radar receiver and feeding output signals to the aforementioned counting means. Thus the maximum range within which the present invention operates may be readily set or established for different circumstances. Furthermore, the invention is provided with a de-activating means to prevent at least certain alarm indications under predetermined conditions such as, for example, docking of a vessel.

The invention hereof is also applicable for utilization with more sophisticated equipment such as, for example, a computer as is commonly incorporated in the navigational system of various large vessels. Such a computer is commonly provided with various kinds of information including vessel bearing and speed as well as radar receiver information so as to produce range, azimuth and speed of objects identified by such receiver. With this more sophisticated system as found on certain vessels the automatic collision warning system hereof may be modified to produce collision warning signals only when a collision is in fact calculated to be likely. Furthermore, the system on one vessel may operate to warn another vessel by audio means.

In the simplified system of the present invention a collision warning signal is produced and an alarm actuated for all circumstances that might conceivably require a determination as to the possibility of collision. Thus the persistence of a radar receiver signal within a predetermined range of a vessel employing the present invention would produce an alarm so that a ship's officer, for example, would be required to determine the probability of collision and the consequent necessity of course or speed change. Naturally if this determination established that no collision would occur, the alarm may merely be de-activated until the particular radar return signal passes out of range, but at any rate the necessity for a decision is established by the present invention.

DESCRIPTION OF PREFERRED EMBODIMENTS

The present invention as briefly outlined above comprises a system for automatically actuating an alarm unit or units under the conditions of a likelihood or even possibility of collision between a vessel carried by the system and some other object. The present invention is particularly directed to ship collision systems, however it will be appreciated that the invention is also applicable to collision warning for other type of vehicles such as aircraft, for example. The following disclosure of this invention is referenced to ships and the problems involved with possible ship collisions.

Figure 1:
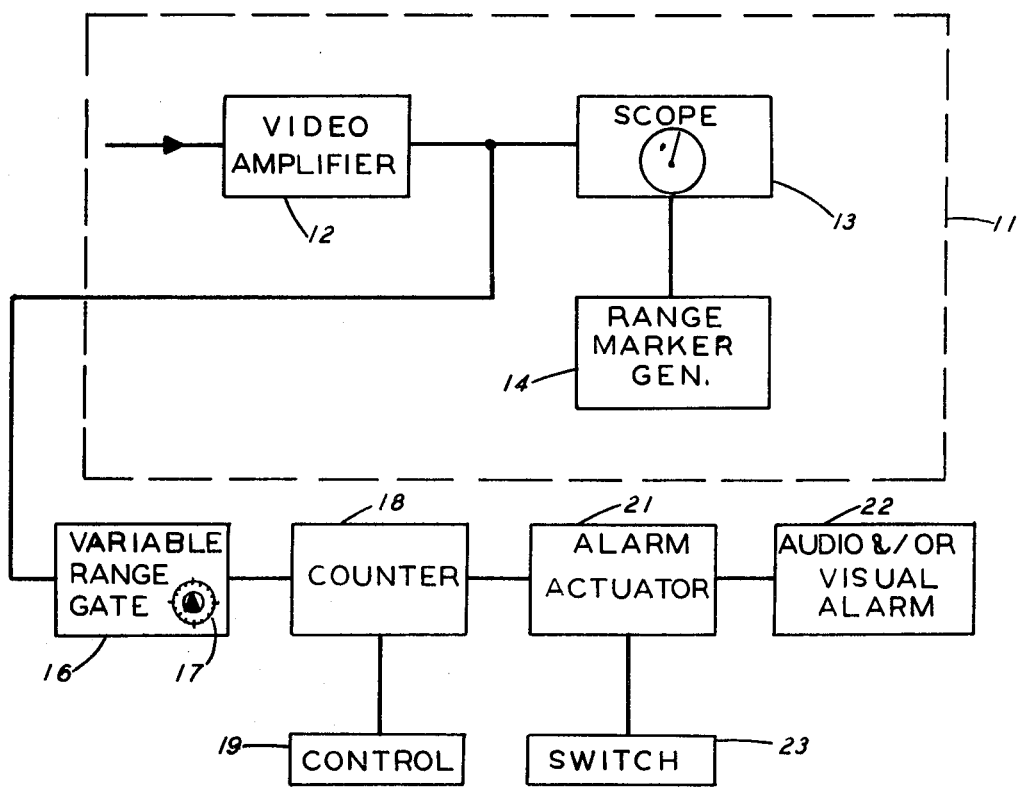
FIG. 1 is a schematic illustration of a simplified embodiment of the present invention.

Considering a preferred embodiment of the present invention and referring first to FIG. 1 of the drawing, there will be seen to be illustrated a radar receiver 11 having as a portion thereof a video amplifier 12 feeding the output thereof to some type of visual screen or scope such as that commonly denominated as a Plan Position Indicator or PPI scope 13. In accordance with conventional radar receiver circuitry, there is also applied to the scope 13 signals from a range marker generator 14 to produce fluorescent range marks. Thus there is visually displayed upon the scope fluorescent indications of objects reflecting radar signals to the receiver 11 and range marks by means of which the range and bearing of such objects may be determined. This scope 13 and the screen thereof is thus available to identify the presence of objects within the radar range and is actuated to repeat the visual indication for every 360° sweep of the radar antenna. The video amplifier 12 produces the signals displayed by the scope 13 and the present invention operates upon these signals produced by the video amplifier 12.

The present invention, again as illustrated in simplified form in FIG. 1, incorporates a variable range gate 16 having the input thereof connected to the output of the video amplifier 12 and including a control 17 by means of which it is possible to establish the range of signals to be passed by the gate 16. The video amplifier 12 of the radar system 11 has an output which contains information relative to the distance or range of signals received by the receiver 11. The variable range gate operates upon this portion of the signal so as to pass only video signals from the amplifier 12 which fall within the range set by the variable range gate control 17. Consequently each video amplifier output signal which would produce a video signal upon the scope 13 within a range determined by the variable range gate 16 is passed by such gate 16 and applied to a counter 18. Note, the range of signals passed by the gate 16 is independent of the range setting of the scope 13. Thus even if a navigator forgets to increase the scope range as required for prudent operation upon leaving a harbor, for example, the present invention properly operates.

In accordance with the present invention, the counter 18 of this invention counts the signals appearing at the output of the variable range gate and includes control means 19 setting the number of input counts necessary to produce an output signal. As a practical matter these control means 19 for the counter 18 may be incorporated therein and preset so that the present invention operates upon a fixed number of counts. Alternatively, it is possible for the counter control 19 to be available to the operator of the present invention so that the counter only produces an output signal upon receipt of a controllable number of radar return signals within the variable ranges set by the gate 16. The counter 18 produces an output signal which is herein applied to an alarm actuator 21 that may be comprised as any one of a number of conventional electrical or electronic circuits of relative simplicity and which in turn produces an output signal capable of actuating an audio or visual alarm 22. This audio and/or visual alarm 22 is preferably provided aboard a vessel in such a position that it immediately calls attention to a helmsman and possibly other personnel aboard the vessel of the possibility of a collision. Also, alarms are preferably provided at various remote locations such as the captain's cabin, etc.

It will be appreciated from the foregoing that the invention as described above operates to produce an alarm signal under those conditions in which a collision is possible between the vessel carrying the invention and some other object identified by the radar system thereof. The radar receiver 11 clearly shows upon the scope thereof those objects falling within some preset radar range and repeats a visual indication of such objects for each 360 degree sweep of the radar antenna. It is again noted that a trained radar operator may determine from the visual indication upon the radar scope such vessels or objects falling within the operating radar range of the system and may calculate the possibility of collision therewith. The present invention, however, is particularly directed to the provision of a collision signal when any object remains within a predeterminable radar range of the vessel for a set number of radar sweeps. This, then, obviates problems of improper scope range setting and places a burden or decision upon some operator, navigator or ship's officer to determine whether or not a collision is likely or even possible. The alarm is actuated if any object remains within the range set by the gate 16 for a predetermined period of time as set by the counter 18, and thus the necessity of decision is reversed from the normal condition existing with a radar system aboard a vessel. Consequently there is provided by this invention a marked improvement in the safety factor of collision avoidance inasmuch as someone aboard the vessel carrying the present invention must make a positive decision that no collision is imminent or possible.

As a further portion of the simplified invention illustrated in FIG. 1, there may be provided a control upon the alarm actuator 21 or some other portion of the present invention such as, by the provision of switching means 23 to de-activate all or a portion of the audio and/or visual alarm unit 22 temporarily once the decision is made that no collision is possible. Utilization of this switching means 23 would, for example, be employed under the circumstances wherein a vessel is passing a fixed object that would under normal circumstances remain within the radar range of the radar unit so as to appear upon the scope 13 for an extended period of time but which is entirely out of the path of movement of the vessel itself. Certain alternative circumstances of operation are also possible wherein the vessel carrying the present invention is, for example, approaching the docking area and thus, with the radar unit energized, there would be produced continuous alarm signals because of the proximity of a dock, for example. Under these circumstances it is possible to de-activate the present invention as by turning the variable range gate control 17 to zero range or furthermore by providing a switch upon the variable range gate which would prevent the passage of signals therethrough to the counter 18.

It is an important portion of the present invention that the audio and/or visual alarm portion 22 thereof shall under normal circumstances produce an output signal, particularly with regard to an audio signal, which alerts all those involved with decisions upon the vessel that a collision is possible. This alarm unit 22 may for example be operable on a bridge of a sea-going vessel but may also operate to sound one or more remote alarms sounding throughout the vessel so as to alert all personnel as to the possibility of a collision. Again it is noted that the present invention, particularly as illustrated in the simplified embodiment thereof in FIG. 1, does not operate to positively establish that a collision is about to occur but instead the invention operates to sound or show an alarm under the circumstances wherein a collision could occur.

Figure 2:
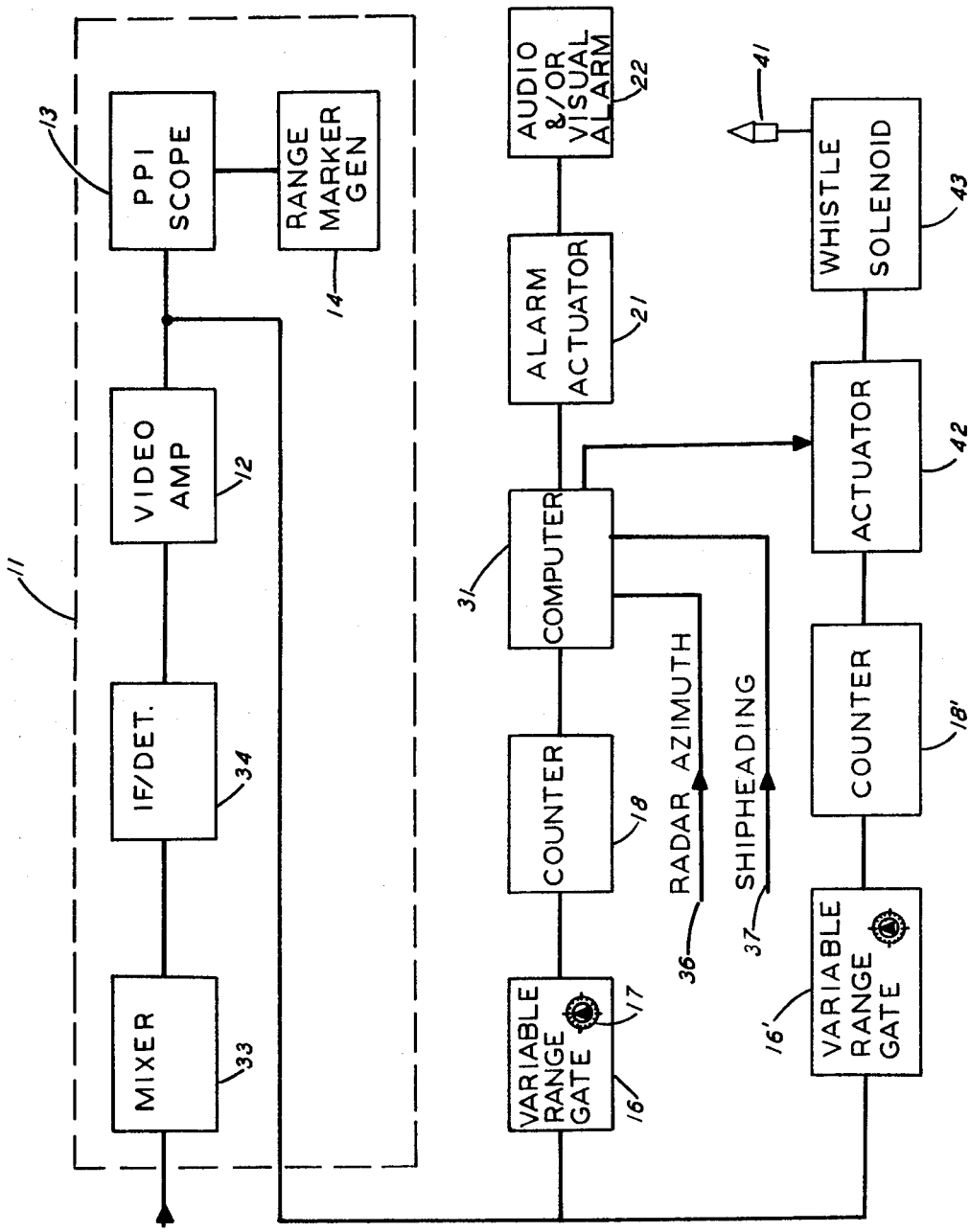
FIG. 2 is a schematic illustration of an embodiment of the present invention employing computer capabilities normally available on large vessels and producing both near and far warnings.

The present invention may be further sophisticated from the simplified illustration in FIG. 1 in the foregoing description thereof. Thus, for example, it is realized that many vessels, whether they be sea-going or airborne, carry radar systems including computer means. There is illustrated in FIG. 2 of the drawing thereof a somewhat more sophisticated system in accordance with the present invention wherein there is provided not only a radar receiver 11 but also the present invention incorporated with a computer 31. In FIG. 2 elements corresponding to the circuitry of FIG. 1 are similarly numbered for convenience of description. The radar receiver is shown in FIG. 2 as including not only the video amplifier 12 but also prior radar circuits including a mixer 33 and an IF detector 34 feeding a signal to the video amplifier 12. This radar receiver also includes a visual display such as a PPI scope 13 receiving not only the output of the video amplifier 12 but also output signals from a range marker generator 14. In this instance the radar receiver 11 is substantially identical to that of the radar receiver illustrated in FIG. 1. Again in accordance with the present invention, the output signal from the video amplifier 12 is applied to a first variable range gate 16 which produces output pulses only upon the occurrence of a video signal within the controllable range of the variable gate 16. These output signals from the gate 16 are applied to the counter 18 which counts the pulses from the gate and produces a signal after receipt of a predetermined number of pulses within an established time period. This time period is of course established by the time required for a complete sweep of the radar transmitter and the number of sweeps encompassed by the counting of the counter 18. Again it is noted that the counter 18 may be preset as, for example, by the factory so that, for example, only upon the receipt of four or possibly five successive gate output signals applied thereto will there be produced an output from the counter 18. There may also be incorporated within the counter 18 a timing means whereby the counter is cleared after some predetermined period of time so that it is necessary for the variable range gate 16 to produce at least a predetermined number of counts within a preset time period in order to produce an output signal therefrom.

In the circuitry of FIG. 2 the output of the counter 18 is applied to a computer 31 which receives not only this output but also signals from a radar azimuth indicator, as indicated by the input line 36 to the computer, and a ship heading signal, as applied through an input line 37 of the computer. These additional computer inputs (36 and 37) provide to the computer the capability of determining not only the possibility of a collision with an object identified by the radar receiver 11 but also the likelihood thereof. Any desired complexity of circuitry incorporating a computer 31 may be employed so that it is possible to produce from the computer a warning signal based upon the persistence of a radar target signal within the range set by the variable range gate 16 and the location of such target as compared to the heading of a vessel carrying the present invention. Under these circumstances the computer output as applied to the alarm actuator 21 not only reflects the possibility of a collision with an object but also the fact that such a collision is likely to occur in the absence of corrective action either by the object or the vessel carrying the invention. Again in accordance with the circuitry of FIG. 2 the alarm actuator 21 has the output thereof applied to an audio and/or visual alarm unit 22 operating not only at a control portion of the vessel carrying the invention but also preferably throughout the vessel. It is to be appreciated that insofar as the determination of an actual collision course with an object determined, for example, through a computer or the like 31 incorporating various input signals, the present invetnion may for example, incorporate conventional collision determination circuitry. It is, however, emphasized that the present invention produces a collision warning signal under any and all conditions of possible collision, even though the invention may be further modified as illustrated in FIG. 2 to clarify the possibility of collision.

The system of this invention such as illustrated in FIG. 2 may also incorporate an additional channel employed to sound a ship's whistle or the like 41 when a collision is imminent. This additional portion of the system includes a second variable range gate 16' having the range thereof set much closer or shorter than that of range gate 16. Thus upon approaching a vessel or other object the gate 16 first passes signals to operate the alarm 22 and thus alert ship personnel to the possibility or likelihood of collision. Should the range to such vessel or object shorten to the lesser range setting of gate 16' signals will be passed to a second counter 18'. After counting a preset number of input signals or pulses within a set time the second counter 18' applies an output signal to an actuator 42 which may also receive the output of computer 31. Concurrence of input signals to the actuator 42 causes same to energize a whistle solenoid 43 or the like to operate the ship's whistle 41. This imminence of collision thus produces an audio alarm by whistle that is transmitted to the object or vessel detected by the radar. Not only is the vessel carrying the system alerted but also any other vessel within the lower or shorter range set by the second range gate 16'. Thus the single system warns both ships. It is noted that the whistle may be keyed by the actuator 42 so as not to automatically sound a passing signal as established by nautical rules of the road but to sound an international warning signal.

It is basic to this invention that the collision warning alarm, whether it be audio or visual, is sounded or energized under any and all circumstances wherein collision may occur. This, then, provides a major departure from prior approaches to collision warning systems and places upon some operator or person in position to make decisions the burden of determining whether or not a collision can occur and whether or not to turn off the alarm system. It is of course necessary to provide in the present invention means for de-activating the system thereof inasmuch as certain circumstances of navigation, flight or the like would otherwise continuously energize the invention. It is, however, contemplated that such entire deactivation of the system can only occur by command decision and that those normally obligated to determine course, speed and the like should be required by the present invention to make a positive determination that no collision can occur. Thus it is not necessary for a navigator, for example, to read or interpret a radarscope to the extent of determining therefrom that a collision could occur. Quite to the contrary, the invention requires such operator or the like having responsibility for decision to determine that no collision can occur, for the alarm of the present invention sounds or is actuated under any and all circumstances where a collision is possible. This then materially changes the basic safety factor involved in any and all collision warning systems and/or radar systems.

It is to be appreciated that the present invention has been described with respect to particular preferred embodiments thereof and furthermore, that various modifications therein are possible within the scope of the present invention. Consequently attention is directed to the following claims for a definition of the invention.

I CLAIM:

1. An automatic warning system for use with a radar receiver having a video signal comprising,
   a variable range gate circuit adapted to receive said video signal, said gate including adjusting means for setting the gate to pass only signals from a range less than an adjustable maximum,
   a counter connected to the output of said gate for counting signals therefrom and producing an output signal upon counting to a predetermined minimum number, and
   an alarm unit connected to said counter and producing an alarm upon receipt of a signal therefrom.
2. The warning system of claim 1 further defined by means adjusting said counter to establish the number of input signals within a predetermined period producing an output signal.
3. The system of claim 1 further defined by means deactivating said system whereby no audio alarm is produced.
4. The system of claim 1 further defined by said variable range gate having a zero range on said adjusting means whereby said system may be rendered inoperable under conditions wherein collision warning is not desired.
5. The system of claim 1 further defined by said variable range gate producing an output pulse for each radar receiver signal occurring within said adjustable range for each 360° radar sweep, and said counter operating upon said gate pulses to produce an output signal upon receipt of predetermined number of gate signals regardless of the likelihood of collision with radar targets whereby said alarm thereupon operates to require alarm deactivation or other action.
6. The system of claim 1 further defined by
   a second range gate circuit connected to receive said video signal and having a substantially shorter range setting than said first range gate circuit,
   a second counter connected to the output of said second range gate and producing an output signal upon receipt of a predetermined number of gate signals,
   an alarm actuator receiving the output of both of said counters to produce an actuating signal for application to a high volume audio alarm.

* * * * *